United States Patent [19]

Fukuoka

[11] 4,101,934
[45] Jul. 18, 1978

[54] CODING SYSTEM
[75] Inventor: Kenji Fukuoka, Fussa, Japan
[73] Assignee: Olympus Optical Co., Ltd., Tokyo, Japan
[21] Appl. No.: 741,994
[22] Filed: Nov. 15, 1976
[30] Foreign Application Priority Data
Nov. 17, 1975 [JP] Japan .................. 50-137215
[51] Int. Cl.² ............... H04N 1/40; H04N 7/12; G08B 1/08
[52] U.S. Cl. .................... 358/261; 178/68; 340/347 DD
[58] Field of Search ............. 358/261, 260; 178/68; 340/347 DD
[56] References Cited
U.S. PATENT DOCUMENTS

| 3,906,485 | 9/1975 | Hong | 178/68 |
| 3,935,379 | 1/1976 | Thornburg | 358/261 |
| 4,003,041 | 1/1977 | van Duuren | 178/68 |
| 4,020,282 | 4/1977 | Halpern | 178/68 |

Primary Examiner—Howard W. Britton
Attorney, Agent, or Firm—Haseltine, Lake & Waters

[57] ABSTRACT

A coding system for effecting band compression transmission of a binary signal such as a facsimile picture signal is disclosed. The coding system is characterized by converting each block of that binary coded m-ary digit which is associated with a length composed of a train of "0" of a binary signal into a code word having that order which corresponds to an original order of the m-ary digit which means the block in one of two groups and converting each block of that binary coded digit which is associated with a length composed of a train of "1" of said binary signal into a code word having that order which corresponds to the original order of the m-ary digit which means the block in another group.

3 Claims, 6 Drawing Figures

RL = 1234
= (1001101001)(2)

1 Variable Length Coding System

2 Split Coding System

3 Coding System According to the Invention

1  Variable Length Coding System

2  Split Coding System

3  Coding System According to the Invention

CODING SYSTEM

FIELD OF THE INVENTION

This invention relates to a coding system for effecting band compression transmission of a binary signal such as a facsimile picture signal.

PRIOR ART

The band compression transmission of the facsimile picture signal has heretofore been eagerly desired for the purpose of reducing expensive circuit tariff and of speeding up information transmission. For this purpose, various kinds of coding systems have heretofore been proposed. These coding systems are mainly divided into the following five systems.

1. Run length coding system.
2. Information density conversion system.
3. Predictive coding system.
4. Multilevel transmission system.
5. Multiplex transmission system.

Among these systems, the run length coding system is relatively simple if compared with the other systems and has the advantage that band compression can be effected. The conventional run length coding system, however, has the disadvantage that there is a risk of the code error being occurred by the influence of direct current cut-off characteristics of the transmission line, and that the positive-negative inversion of a received record picture could not be effected by a mere polarity inversion of a transmission code.

SUMMARY OF THE INVENTION

An object of the invention, therefore, to provide a coding system which belongs to a run length coding system, but can reliably be applied to a coding device in a relatively simple manner, which is not subjected to the influence of the direct current cut-off characteristics of the transmission line with substantially the same compression ratio as that of the conventional run length coding system maintained.

Another object of the invention is to provide a coding system which can effect a positive-negative inversion of a received record picture by a mere polarity inversion of a transmission code.

The principle of various kinds of run length coding systems will now briefly be described with reference to the following Table I.

Table 1

| Natural binary digit | ① Variable length coding system | ② Split coding system | | ③ Coding system according to the invention | |
|---|---|---|---|---|---|
| | | White ("0") RL | Black ("1") RL | White ("0") RL | Black ("1") RL |
| 0 | — | 000 | 100 | 000 | 111 |
| 1 | 10 | 001 | 101 | 101 | 010 |
| 10 | 11 | 010 | 110 | 110 | 001 |
| 11 | 010 | 011 | 111 | 011 | 100 |
| 100 | 011 | 001000 | 101100 | 101000 | 010111 |
| 101 | 00100 | 001001 | 101101 | 101101 | 010010 |
| 110 | 00101 | 001010 | 101110 | 101110 | 010001 |
| 111 | 00110 | 001011 | 101111 | 101011 | 010100 |
| 1000 | 00111 | 010000 | 110100 | 110000 | 001111 |
| 1001 | 0001000 | 010001 | 110101 | 110101 | 001010 |
| 1010 | 0001001 | 010010 | 110110 | 110110 | 001001 |
| 1011 | 0001010 | 010011 | 110111 | 110011 | 001100 |
| 1100 | 0001011 | 011000 | 111100 | 011000 | 100111 |
| 1101 | 0001100 | 011001 | 111101 | 011101 | 100010 |
| 1110 | 0001101 | 011010 | 111110 | 011110 | 100100 |
| 1111 | 0001110 | 011011 | 111111 | 011011 | 100100 |

Referring to Table I, ① designates a conventional variable length coding system, ② a conventional split coding system and ③ one embodiment of the coding system according to the invention. All of these coding systems function to effect coding of a signal level of a binary signal such as a facsimile picture signal obtained by scanning an original picture, that is, a length composed of a series of black or white levels which is so-called run length which will hereinafter be abbreviated as RL.

The Table I shows RL codes of the coding systems ①, ② and ③. In each system, the RL codes are made longer than the natural binary digits to be able to separately be recognized to clearly show any two adjacent RL codes. If the RL code is of $n$ given lengths, such problem of making clear the position between adjacent RL codes might be eliminated. In this case, however, the compression ratio becomes degraded.

In principle, a so-called compact code having a shortest average code length has been known as Shannon-Fano code or Huffman code. Such compact code, however, is not always suitable as codes which are applicable to coding system. On the one hand, as statistical property, the shorter RL is the higher probability is offered. As a result, if a shorter RL is represented by a short code, it is possible to obtain a code which is substantially equal to the compact code.

In the conventional variable length coding system ①, each RL is coded irrespective of the original picture signal run represented by white or black. To a short RL 1 is allotted a specially short code "10" and to a short RL 2 is allotted a specially short code "11". When "0" is detected in the first bit, the second bit is decoded to a code "1" of 1 bit. When "1" is detected in the first bit, the second bit is decoded to a code "10" of 2 bits. RL larger than 3 is represented by a train of codes composed of "0" whose number is $(n-1)$ bits which is smaller by 1 than the effective bit number n of a code representing the natural binary digit and a code (RL-1)(2) representing the natural binary digit having a value given by substracting 1 from RL. For example, RL 10 is coded to "0001001" composed of three "0" which is smaller by 1 than the effective bit number 4 and a code "1001" representing the natural binary digit of a value 9 which is obtained by subtracting 1 from 10. RL may be decoded by obtaining a number $n-1$ of successive "0" from the top of a code to be decoded and by adding 1 to the natural binary digit composed of effective bits having n bits. In this coding system, RL having n bits represented by the natural digit is coded to $(2n-1)$ bits or $(2n-3)$ bits. Black RL is discriminated from white RL by inserting a flag bit representing black or white RL of the original picture into the synchronizing signal to determine whether the first RL code following thereto in a train of received RL codes is black or white.

The following successive RL codes are discriminated such that these successive RL codes are black when the RL code preceding thereto is white and that these successive RL codes are white when the RL codes preceding thereto is black.

In the conventional split coding system ② shown in the Table I, the natural binary digit RL (2) is split from its lower position into a given bit number of blocks. When the number in the block at the uppermost position is smaller than a given number of bits, "0" whose number is equal to the insufficient number is added as a dummy to the upper position. In the example shown in the Table I, a block is composed of 2 bits. When RL represents white, "0" is added as a flag bit to each block and when RL represents black, "1" is added as a flag bit to each block. The white RL 9, for example, is coded into "010001" by splitting the natural binary digit "1001" from the lower position into two blocks "10" and "01", adding white flag bit "0" to each of these blocks "10" and "01" to obtain "010" and "001", respectively, and then coding them into "010001". The black RL 9 may be coded to "110101" in the same manner.

In the case of decoding, the received signal is split into blocks each including bits which are obtained by adding 1 bit as a flag bit to a given bit number of the above mentioned block (3 bits in the example shown in the Table I). The flag bit in each block is so examined that a series of blocks whose flag bit has a same value are assembled. RL is represented by those natural binary digit values which are remained when each flag bit is removed from the blocks. The flag bit functions to represent white or black. In the split coding system ②, RL code of n bits represented by the natural binary digit is coded into $n(K+1)/K$ bits (decimal portion is counted as one bit) where K is a bit representing a block.

The invention will now be described with reference to its ability of eliminating the influence of the direct current cut-off characteristics of the transmission line with substantially the same compression ratio as that of the conventional run length coding system and its ability of effecting a positive-negative inversion of a received record picture by a polarity inversion of a transmission code.

In the conventional variable length coding system ①, "0" is intentionally continued in succession, so that it is clear that this coding system includes a plenty of direct current components or low frequency band components. As a result, the conventional variable length coding system ① is not suitable for a transmission line having a direct current cut-off characteristics. In addition, the conventional variable length coding system ① has levels which are the same with each other and continues for a long duration, so that there is a risk of synchronization of bits being degraded in timing.

On the contrary, the split coding system ② has same continuous levels which are relatively short in length, so that the synchronization of bits is effected in good timing and hence such ability is superior to that of the variable length coding system ①. In the split coding system ②, however, "0" is added as a flag bit to the white RL and "1" is added as a flag bit to the black RL, so that the white code has a plenty of "0" and the black code has a plenty of "1". As a result, the converted code includes a low frequency band component with a period of changing from black to white and vice versa, so that if an original picture signal having a plenty of white or black is coded, a considerably large amount of direct current component is produced. Thus, there is a risk of fidelity of a information transmission being degraded in a transmission line having a direct current cut-off characteristics.

In addition, in both the variable length coding system ① and the split coding system ②, if the signal polarity of the transmission code is inverted, the meaning of the code becomes entirely different one and hence the picture image becomes meaningless.

On the contrary, the coding system according to the invention ③ is capable of improving the above mentioned direct current cut-off characteristics of the transmission line and effecting positive-negative inversion of the received record picture by merely inverting the signal polarity of the transmission code.

The principle of the coding system according to the invention ③ will now be described. In order to make the code strong against the direct current cut-off characteristics of the transmission line, use is made of a train of codes per se which do not include a direct current component nor a low frequency band component. For this purpose, in the coding system according to the invention ③ in the case of coding RL, if the white RL and the black RL are alternately present, the frequency of appearance of "0" and "1" constituting these white and black RL is made equal with each other. In addition, even when the white RL code only is produced in succession or the black RL code only is produced in succession, the frequency of appearance of "0" and "1" is made equal with each other.

The use of such measures ensures elimination of the direct current component and reduction of the low frequency band component.

In accordance with the invention, the following coding process is effected for the purpose of attaining the above mentioned object. At first, white and black RL to be coded is represented by a binary coded m-ary digit. This m-ary digit is divided from its lower position into blocks each composed of n bits, that is, block units. If the block at the uppermost position is smaller than n bits, "0" which is equal to the shortage of bits is added as dummy to the upper position.

That is, in the coding system according to the invention ③ shown in the Table I, m is 4 (quaternary) and n is 2 bits. Each block thus obtained is converted into a code word which corresponds to 0, 1, ..., m−1 of the m-ary digits. In this case, as these codes m of white pel and m of black pel and hence 2m are required. Pel is an abreviation of a picture element.

As a result, these code words are required to be constituted by cord words composed of at least n+1 bits. If use is made of a given length of code word for the purpose of discriminating adjacent positions of code words from each other, the length of the code word is required to be longer than (n+1) bits. As a result, it is clear that 2m codes can be selected without overlapping from a original set composed of code words each having a given length of longer than l(≧n+1) bit, and that these 2m codes can be converted into m-ary digit which can be taken by each block in correspondence with white and black, whereby code words can be discriminated from each other and hence can be decoded.

In order to attain the object of the invention, it is necessary not only to effect any corresponding conversion, but also to satisfy the following conditions. That is, one original set of m-ary code words given to a block representing a white RL is made a first group and another orignal set of m-ary code words given to a block representing a black RL is made a second group. In this case, in each group, the number of "0" constituting all of the code words belonging to each group is brought into agreement with the number of "1". As a result, even when code words representing white, for example, are continued or even when code words representing black pel are continued, the probability of frequency of appearance of "0" becomes the same as that of "1". Thus, it is possible to substantially suppress the direct current component which is the cause of the influence of the direct current cut-off characteristics of the transmission line and eliminate the low frequency band component. In the coding system according to the invention ③ in which RL is represented by binary coded quaternay digit, the number of bits is made 2 and use is made of a code word composed of 3 bits, 4 code words "000", "101", "110" and "011" are selected as the first group of code words which correspond to the original element of the quaternary digit 0, 1, 2 and 3 of the white block and 4 code words "111", "010", "001" and "100" are selected as the second group of code words which correspond to the original element of quaternary digit 0, 1, 2 and 3 such that the number of "0" constituting the code words belonging to the first group and the number of "1" constituting the code words belonging to the second group are equal to 6, respectively.

BRIEF DESCRIPTION OF THE DRAWINGS

The invention will now be described in greater detail with reference to the accompanying drawings, wherein.

DETAILED DESCRIPTION

The conventional variable length coding system ① and the conventional split coding system ② will now be compared with the coding system according to the invention ③ in the case of coding RL of 1234, that is, a natural binary digit "10011010010", for example, into a series of codes.

Figure 1:
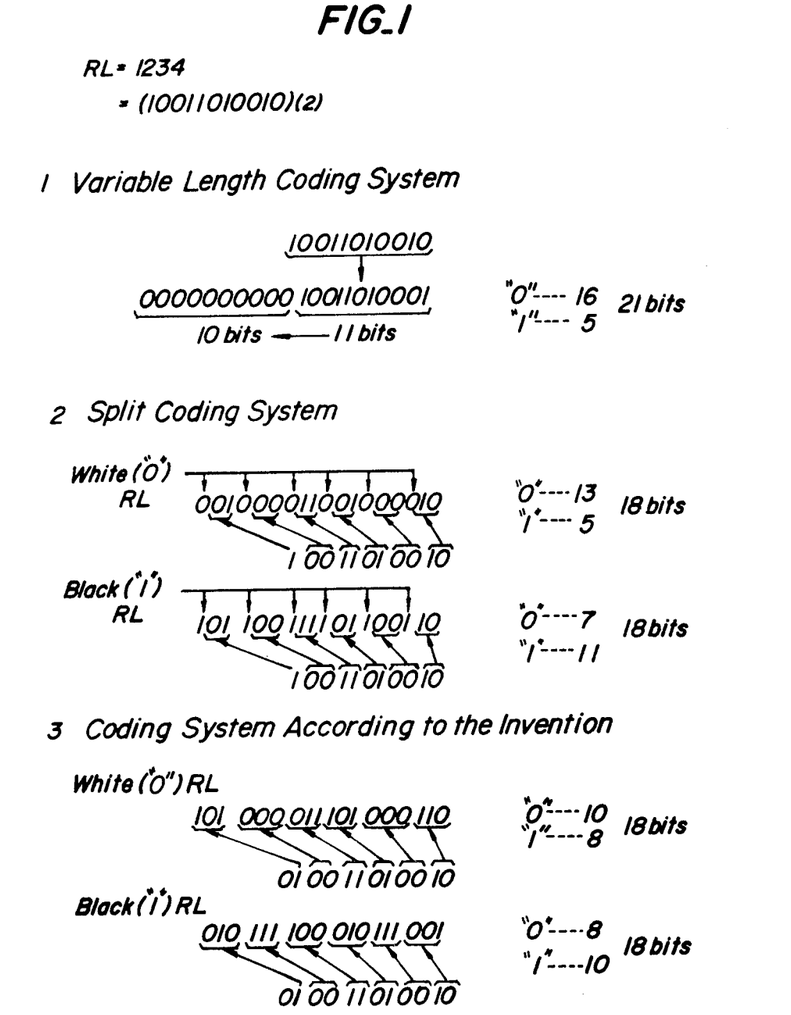
FIG. 1 is a diagram illustrating a train of codes obtained by two conventional coding systems and the coding system according to the invention in the case of RL=1234.

As shown in FIG. 1, in the variable length coding system ①, the natural binary digit is converted into 21 bit code composed of 0 of 10 bits which is smaller 1 than the effective bit number 11 and added to the top of a natural binary digit "10011010001" which is smaller 1 than RL 1234. As a result, the number of "0" becomes 16 and the number of "1" becomes 5 and these numbers of "0" and "1" are extremely unbalanced. In addition, 10 bits of "0" are concentrated into one position, so that irregular synchronization of bits might occur.

In the split coding system ② shown in FIG. 1, the binary bits of RL 1234 is divided from its lower position into 6 blocks each including 2 bits. When RL 1234 is white, a flag bit of "0" is added to each block to obtain 18 bits. When RL 1234 is black, a flag bit of "1" is added to each block to obtain 18 bits. Thus, the binary bits of RL 1234 are coded into a code of 18 bits. When the RL 1234 represents white pel ("0"), the number of "0" becomes 13 and the number of "1" becomes 5. When the RL 1234 represents black ("1"), the number of "0" becomes 7 and the number of "1" becomes 11. Thus, the split coding system ② also causes unbalance.

On the contrary, in the coding system according to the invention ③ shown in FIG. 1, the binary bits of RL 1234 as the binary coded quaternary bit is divided from its lower position into 6 blocks each including 2 bits. When the RL 1234 is white, these 6 blocks are converted into code words which correspond to a first group of bits shown in the column ③ in Table I. When the RL 1234 is black, these 6 blocks are converted into code words which correspond to a second group of bits shown in the column ③ in Table I. As a result, when the RL 1234 represents white, the number of "0" becomes 10 bits and the number of "1" becomes 8 bits and when the RL 1234 represents black, the number of "0" becomes 8 and the number of "1" becomes 10. As seen from the above comparison, the balance between the number of "0" and the number of "1" in the coding system according to the invention ③ is far superior to those in the conventional coding systems ① and ②. The unbalanced component in the coding system according to the invention ③ is generally continuously present in front of and in the rear of the other RL code, so that the unbalanced component appears as the low frequency band component in a spectrum of the transmission code signal.

As to the direct current component in the coding system according to the invention ③, since the same number of "0" and "1" is allotted to the code, the probability of appearance of "0" and "1" for a sufficiently long series of codes is equal with each other. As a result, the direct current component is also suppressed. In the split coding system ② the code for that part of an original picture which includes a plenty of white pels is concentrated into "0" and the code for that part of the original picture which includes a plenty of blacks pels is concentrated into "1". As a result, the split coding system ② can not sufficiently suppress the direct current component or a very low frequency component. On the contrary, the coding system according to the invention ③ is capable of suppressing the direct current component of the original picture even when it contains a plenty of whites pels or black pels.

In addition, in the coding system according to the invention ③ shown in the Table I, the code word belonging to the first group representing the white RL and the code word belonging to the second group representing the black RL, both the cord words meaning the same RL, are complementary with each other, that is, "0" belonging to the first group is replaced by "1" belonging to the second group and vice versa. As a result, it is possible to effect positive-negative inversion of the received reproduced picture by the signal polarity inversion of the transmission code.

The coding system according to the invention ③ shown in the Table I is of binary coded quaternary digit, i.e. $l=3$, $m=4$, $n=2$.

Another embodiments of the coding system according to the invention will now be described with reference to the following Table II.

Table II

| | ④ l = 4, m = 4, n = 2 | | | ⑤ l = 4, m = 3, n = 2 | | |
|---|---|---|---|---|---|---|
| RL | Binary coded quaternary digit | White ("0") RL | Black ("1") RL | Binary coded ternary digit | White ("0") RL | Black ("1") RL |
| 0 | 00 | 1001 | 0110 | 00 | 1001 | 0110 |
| 1 | 01 | 0101 | 1010 | 01 | 0101 | 1010 |
| 2 | 10 | 0011 | 1100 | 10 | 0011 | 1100 |
| 3 | 11 | 0001 | 1110 | 0100 | 01011001 | 10100110 |
| 4 | 0100 | 01011001 | 10100110 | 0101 | 01010101 | 10101010 |
| 5 | 0101 | 01010101 | 10101010 | 0110 | 01010011 | 10101100 |
| 6 | 0110 | 01010011 | 10101100 | 1000 | | |
| 7 | 0111 | 01010001 | 10101110 | | | |
| 8 | 1000 | | | | | |

In another embodiment of the coding system according to the invention ④ shown in Table II, the original set of the code words is made large by giving $l=4$, $m$ and $n$ being remained the same as in the previous embodiment by giving $m=4$ and $n=2$. In the present embodiment, [1001], [0101], [0011] and [0001] for the white RL and [0110], [1010], [1100] and [1110] for the black RL are selected from a original set of code words each including 4 bits with respect to the original elements [00], [01], [10] and [11] of the binary quaternary digit which represents RL, respectively, and each block is converted in correspondence with the above selected code words. In the present embodiment, the code words selected from the original set of the 4 bits code words include the number of "0" which is equal to the number of "1" except the code words "0001" given for the white "11" and "1110" given for the black "11". As a result, the code words contain substantially no direct current component. Thus, the present embodiment ensures a more sufficient suppression of the direct current component or the low frequency band component if compared with that of the previous embodiment ③ shown in the Table I.

In a further embodiment of the coding system according to the invention ⑤ shown in the Table II, $l=4$, $m=3$ and $n=2$ and RL code is represented by binary coded ternary digit. In the present embodiment, [1001], [0101] and [0011] for the white RL and [0110], [1010] and [1100] for the black RL are selected from the original set of code words each including 4 bits on the basis of original elements [00], [01] and [10] of the binary coded ternary digit which represents RL, respectively. As a result, it is possible to allot those code words only which do not completely include the direct current component for all of the blocks. However, in the present embodiment, the compression ratio becomes degraded.

In the above described embodiments of the coding system according to the invention, each constant l, m and n is not limited to the above value, and various values of positive integer may be given to these constants.

The invention will now be described with reference to a concrete construction of a device for carrying out the coding system according to the invention.

Figure 2:
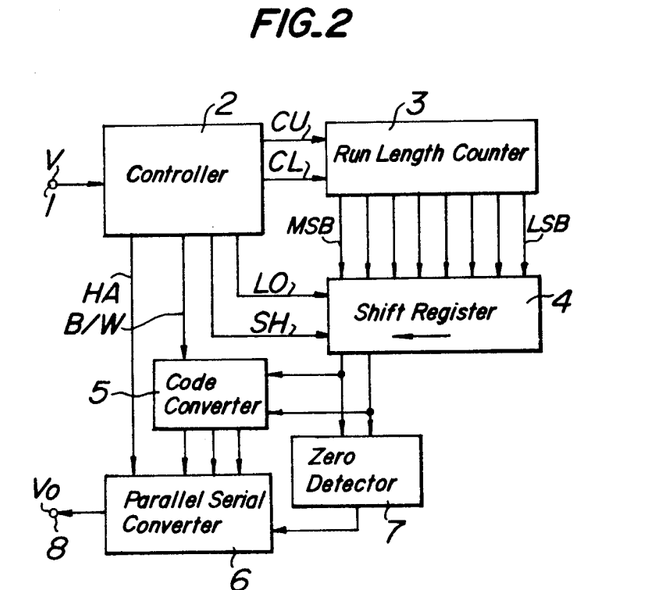
FIGS. 2, 3 and 4 are block diagrams showing three embodiments of a coding device for carrying out the coding system according to the invention.

In FIG. 2 is shown one embodiment of the device for carrying out the coding system according to the invention. A binary signal V representing white and black to be coded is supplied from an input terminal 1 to a controller 2 which delivers a count up pulse CU to a run length counter 3 during a period of a white run length or a black run length of the binary signal V. When a changing point between white and black is detected by the controller 2, a load signal LO is supplied from the controller 2 to a shift register 4 to which the content RL of the run length counter 3 is also transferred. Then, the run length counter 3 becomes cleared by a clear pulse CL supplied from the controller 2 to continue its counting operation in succession. A shift pulse SH supplied from the controller 2 to the shift register 4 causes the content RL of the run length counter 3 transferred to the shift register 4 to shift n bits toward the most significant bit side (MSB side) at a block (in FIG. 2, $n=2$). The shift register 4 delivers the n bits at a block from its MSB side to a code converter 5 to which is also supplied from the controller 2 a black and white information B/W associated with the block concerned. In the code converter 5, each block is converted into a corresponding code word of white or black in accordance with a code conversion Table I, column ③, Table II, column ④ or column ⑤ and these code words are delivered to a parallel-serial converter 6. Such code conversion may be carried out by a well known transistor transistor logic gate (TTL gate), programmable logic array (PLA), etc. The parallel-serial converter 6 functions to change the code data in successive blocks thus converted into code from parallel to serial and the serial code data in successive blocks Vo is delivered to an output terminal 8.

In the case of changing the code data in successive blocks from parallel to serial while converting codes n bits by n bits from the upper bit of the content RL of the run length counter 3, the RL data of the block of n bits supplied from the shift register 4 to the input terminal of the code converter 5 is also supplied to a zero detector 7 which functions to supervise the RL data of the block of n bits such that an upper redundant data which corresponds to "0" is disregarded without changing it to a serial data. When the zero detector 7 detects a non-zero significant data of n bits, the zero detector 7 delivers an output Z to the parallel-serial converter 6 so as to start its operation. When the coding operation of the content RL of the run length counter 3, that is, the content of the shift register 4 is terminated, the controller 2 delivers a stop signal HA to the parallel-serial converter 6. As a result, the parallel-serial converter 6 becomes stopped and ready for arrival of the significant RL data. In the similar manner, the successive contents RL of the run length counter 3 will be coded. In this way, at an output terminal 8 of the parallel-serial converter 6 is obtained a coded output Vo of the binary signal V supplied to the input terminal 1 of the controller 2.

In the above described embodiment shown in FIG. 2, the RL data of the run length counter 3 is supplied to one code converter 5 in succession at every block including n bits from MSB side and coded in succession.

Figure 3:
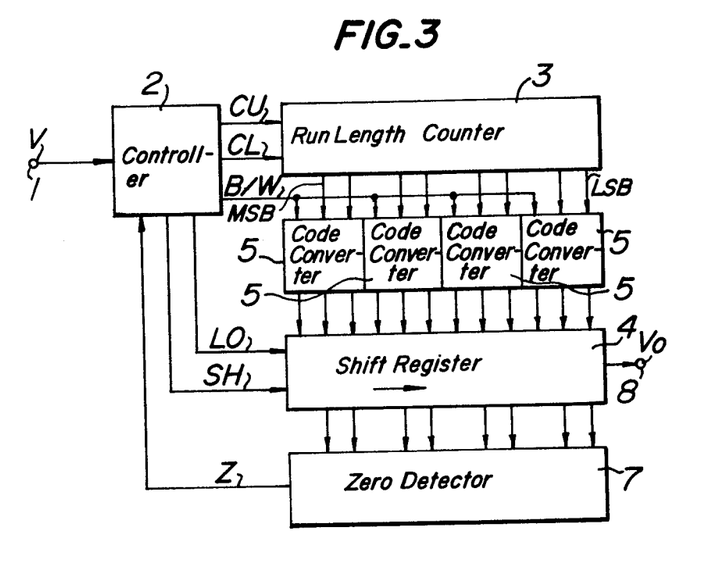

In FIG. 3 is shown another embodiment of the device for carrying out the coding system according to the invention. In the present embodiment, the RL data of the run length counter 3 is divided into blocks each including n bits from the least significant side (the LSB side) and all these blocks are supplied to a plurality of code converters 5, 5, 5 . . . by which the RL data is coded. In FIGS. 2 and 3, the same reference numerals and symbols designate the same elements and signals. In the same manner as in the embodiment shown in FIG. 2, the binary signal V representing white and black is supplied from an input terminal 1 to the controller 2.

The run length counter 3 functions to count the white run length or the black run length of the binary signal V. After termination of the count of run length, the content RL of the run length counter 3 is transferred from the LSB side to that code converter 5 which corresponds to each of blocks including n bits. At the same time, to each of these code converters 5 is supplied the black and white information B/W.

The same code conversion as in the previous embodiment shown in FIG. 2 is effected in each of the code converters 5 which corresponds to each block and the code data thus obtained is loaded to the shift register 4. The code data loaded to the shift register 4 is shifted from the LSB side to the output terminal 8 to obtain the coded output Vo. In this case, "0" is supplemented from the MSB side. After the termination of shift of the significant portions, all of the parallel outputs from the shift register 4 become "0" which is detected by the zero detector 7. Then, the zero detector 7 delivers the output signal Z to the controller 2 so as to stop the coding operation of the RL data after the code data of the final significant block has been delivered. The coding operations will be continued in the similar manner.

Figure 4:
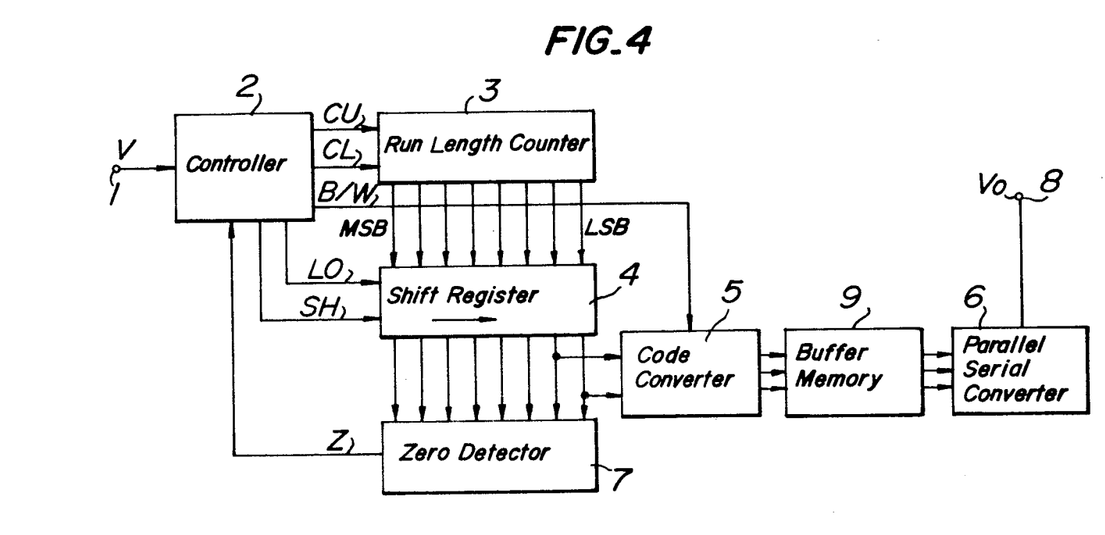

In FIG. 4 is shown a further embodiment of the device for carrying out the coding system according to the invention. In FIGS. 2, 3 and 4, the same reference numerals and symbols designate the same elements and signals. In the embodiment shown in FIG. 3, the data of each block are converted in parallel and at the same time into codes. On the contrary, in the embodiment shown in FIG. 4, the RL data is loaded to the shift register 4 which functions to shift as a block unit from the LSB side to the code converter 5. The code converter 5 effects code conversion in succession. In the present embodiment, the code data thus obtained are accumulated in the form of words in a buffer memory 9 whose output is supplied to the parallel-serial converter 6 and converted into the serial data. The coding operation with respect to one RL data is terminated in the same manner as in the embodiment shown in FIG. 3.

Figure 5:
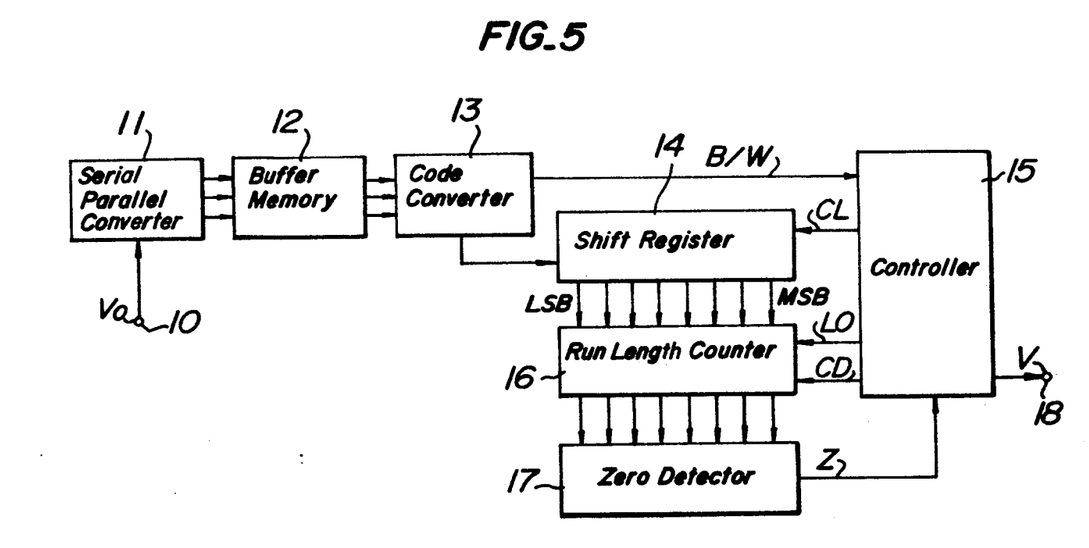
FIGS. 5 and 6 are block diagrams showing two embodiments of a decoding device for decoding the codes obtained by the coding system according to the invention.

In FIG. 5 is shown one embodiment of a decoding device for decoding the codes obtained by the coding system according to the invention. The code data Vo arrived as the serial data at an input terminal 10 are supplied to a serial-parallel converter 11 which functions to convert the serial data into a parallel data with a code word having a given length which is then accumulated in the form of word in a buffer memory 12. The content of the buffer memory 12 is inverted into word unit, that is, block unit by a code converter 13 which functions to discriminates white from black and vice versa so as to supply the data on the block which constitutes the same RL as n bit portions of binary coded m-ary digit to a shift register 14 and shift it to the MSB side.

In the embodiment shown in FIG. 5, the RL data is assumed to be transmitted in succession from the MSB side. When inversion of white and black is discriminated and detected by the code converter 13, a load signal LO is delivered from a controller 15 to a run length counter 16. The load signal LO causes the RL data decoded in the shift register 14 to be loaded to the run length counter 16. Then, the clear pulse CL is delivered from the controller 15 to the shift register 14 to clear it. As a result, the decoding operation of one of the RL data is terminated and then the inversion of the next RL data is effected.

The run length counter 16 serves to continuously count down a count down pulse CD supplied from the controller 15 until a zero detector 17 functions to detect that all of the contents of the run length counter 16 become "0". During this time, the level corresponding to the inversion output relating to white and black delivered from the code converter 13 is maintained, whereby the black and white RL signal V is reproduced at an output terminal 18. Then, the above described steps are repeated and the code data Vo becomes completely decoded to the RL signal V.

Figure 6:
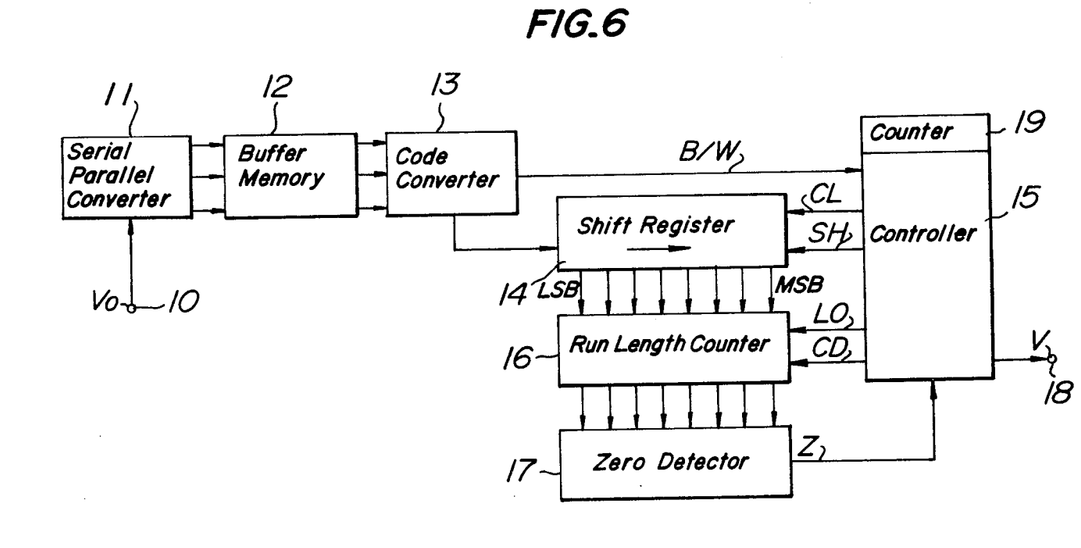

In FIG. 6 is shown another embodiment of the decoding device for decoding the codes obtained by the coding system according to the invention. In the present embodiment, the RL data Vo is assumed to be transmitted in succession from the LSB side. The code data Vo arrived as the serial data at the input terminal 10 are supplied to the serial-parallel converter 11 which functions to convert the serial data into the parallel data in the form of word unit which is then accumulated in the buffer memory 12. The content of the buffer memory 12 is inverted in word unit, that is, block unit by the code converter 13 and then supplied to the shift register 14. If this data contains an initial white or black RL data, that is, LSB, the controller 15 causes this data to be loaded to the run length counter 16 and the shift register 14 becomes cleared.

Let the RL value to be received be RL=1234, that is, a binary digit of "10011010010". The initial received data is "10", so that this information per se means RL=2. As a result, this data loaded in the run length counter 16 is converted into a time information of the black and white data by the count down method in the same manner as described with reference to the embodiment shown in FIG. 5. After termination of the data processing of the first block, "1" is added to and memorized in a counter 19 provided in the controller 15.

The data of the next block read out from the buffer memory 12 is treated in the same manner and "00" as the RL of the second block is loaded to the shift register 14. This data is the second data in the content of the counter 19 provided in the controller 15 and means "0000" by taking the effective number of digits in practice into consideration. As a result, the controller 15 functions to shift $n=2$ bits for one block toward the MSB side and "0000" is loaded to the run length counter 16. The zero detector 17 functions to deliver its output, so that count down is not effected. After termination of the treatment of the second block, "1" is added to the counter 19 provided in the controller 15. In the same steps as described above, RL data "01" of the next block is prepared in the shift register 14 and the content "2" of the counter 19 provided in the controller 15 causes shift of two blocks.

As a result, the real RL value "010000" thus converted is loaded to the run length counter 16. Then, the run length counter 16 is counted down by the two blocks and functions to add the time information of the black and white data.

As described above, the RL is decoded as the time information. When the black and white are inverted, the code converter 13 functions to deliver an output to the controller 15 and the counter 19 provided in the controller 15 is cleared. Thus, the next RL is decoded.

It is a matter of course that alternations and modifications may be made to the above described two decoding devices.

What is claimed is:

1. A coding method comprising forming an assembly of code words prepared by converting a length composed of a train of "0" and a length composed of a train of "1" into a binary coded m-ary digit composed of $m$ original elements each represented by a binary code including $n$ bits, said "0" and "1" being a binary signal of facsimile to be coded, dividing said binary coded m-ary digit code into blocks each including $n$ bits, said blocks each including an original unit, selecting $2m$ code words without permitting any overlap thereof from an original set of binary code words having a given length of at least $n+1$ bits, dividing said $2m$ code words into two groups each including $m$ code words, bringing the number of "0" constituting all of the code words belonging to each group into agreement with the number of "1" thereof, and arranging in order each of the code words belonging to each group, said coding method further comprising converting each block of that binary coded m-ary digit which is associated with said length composed of a train of "0" of said binary signal into a code word having that order which corresponds to the original order of the m-ary digit which means said block in one of said groups and converting each block of that binary coded m-ary digit which is associated with said length composed of a train of "1" of said binary signal into a code word having that order which corresponds to said original order of the m-ary digit which means said block in another group.

2. A coding method as claimed in claim 1, wherein those code words which are in the same order in said two groups are complementary with each other.

3. A coding method as claimed in claim 1, wherein a coded binary signal is decoded by converting inversely each code word of said binary signal to obtain a block composed of information representing a group to which belongs said code word and said binary coded m-ary digit which corresponds to the order of said code word, making continuous each block thus obtained for the same group on the basis of that information which represents said group thus converting into a binary coded m-ary digit code which represents a length composed of a train of "0" or a length composed of a train of "1" and converting that numerical value which represents said binary coded $m$-ary digit code into said length composed of a train of "0" or said length composed of a train of "1".

* * * * *